Patented Mar. 19, 1940

2,194,188

UNITED STATES PATENT OFFICE 2,194,188

METHOD OF PRODUCING VITAMIN D PRODUCT

George C. Supplee, Bainbridge, N. Y., assignor to The Borden Company, New York, N. Y., a corporation of New Jersey No Drawing. Application June 29, 1935, Serial No. 29,028

19 Claims. (Cl. 167—81)

This invention relates to the preparation of materials rich in vitamin D and more particularly to the preparation and use of a vitamin D-protein simplex suitable for use in food or medicinal products.

Very considerable amounts of clinical and biological research work have been conducted in connection with the effect of vitamin D upon animals and human beings and particularly in the effect of this vitamin in the dietary of infants as a prevention or cure for rickets. It has been previously found that vitamin D may be synthesized by treatment of food products and medicinal preparations with ultra-violet ray or they may be prepared in other ways. For example, a product of high antirachitic value may be prepared by irradiating cows' milk or by using the milk from cows fed irradiated yeast, or by irradiation of crude sterols (as in preparation of viosterol). Also, cod liver oil has been found to contain this vitamin. It has been the common view that the vitamin D in irradiated milk is entirely associated with the oil or fat and that the increased effectiveness in the milk is attributable to the calcium and phosphorous content of the milk.

An important feature of the present invention is the discovery that vitamin D may be caused to become associated with proteinaceous matter, for example, lactalbumin, in milk, and that such combination or association of the vitamin D and proteinaceous matter (as lactalbumin) has greater antirachitic effectiveness than the same amount of vitamin D not so associated or combined with proteinaceous matter. Another important feature is the discovery that such a combination or association of vitamin D and proteinaceous matter can be separated from the aqueous medium, dried and redispersed as a colloidal solution with full or substantially full retention of the vitamin effectiveness of the vitamin D-lactalbumin combination in its original aqueous medium.

I have also found that certain protein constituents separated from milk, as for example lactalbumin, with prosthetically bound lipid material, can be activated with vitamin D by irradiation with ultra-violet rays; also that such proteinaceous materials, with or without prosthetically bound lipid material, can be activated by contacting a water suspension of it with suitable substances rich in vitamin D, for instance, in a solution which is miscible with water and which permits a high degree of diffusion of the vitamin in contact with the dispersed proteinaceous matter; appropriate solvents for vitamin D miscible with water are, for example, propylene glycol, ethyl alcohol or certain other alcohols.

Reference is made herein to the product as a simplex since the proteinaceous matter, lactalbumin, for example, acts as the high molecular carrier and the vitamin D as the prosthetic group, and the biological data clearly demonstrate that the combination of the lactalbumin with vitamin D has more biological activity than vitamin D without the high molecular carrier. However, there may be still some question as to the distinction between simplex and complex and it is not intended to restrict the invention by the particular terminology used or theoretical explanation given or to exclude equivalent materials or procedures because they may be considered to relate to complexes rather than to simplexes.

It is an object of the present invention to provide a new method for preparing products suitable for use as, or in the preparation of foods or medicinal products, which are rich in vitamin D and of high antirachitic value. Another object is to provide a method of preparing a vitamin D containing product in which the effectiveness and the antirachitic value of the vitamin D are enhanced. It is also an object to produce a new product of enhanced vitamin D effectiveness, including the preparation of a water soluble antirachitically active substance combined with or associated with protein material, in the absence or substantial absence of fats or oils. It is also an object to provide a new method for increasing the vitamin D or antirachitic value of milk or milk products. Other objects will become apparent.

As a specific example of the preparation of a vitamin D-protein simplex in accordance with the present invention, one or more of the purified or impure soluble albumins prepared as described in Patent No. 2,023,014, granted upon the copending application Serial No. 650,499 of Supplee and Flanigan, may be used. A predetermined quantity of the albumin, which may or may not have been previously desiccated, is added to water, the amount being such as to permit complete or substantially complete solution or colloidal dispersion of the albumin used. If by virtue of the selection of a product of relatively impure grade, there is any substantial or objectionable degree of turbidity or agglomeration of protein or extraneous products, such may be removed, if desired, by mechanical means as, for example, by filtration or sedimentation, or centrifuging. A satisfactory concentration of the solubilized albumin is between .02% and .5%. Concentrations on either side of these limits may, however, be used if practical considerations so dictate. It is desirable, however, to have the albumin in a high degree of colloidal dispersion in order that the maximum surface of contact between the dispersed molecules or colloidal particles of the protein, and the similarly highly dispersed or diffused molecules of the vitamin D carried by the added vitamin bearing material, may be obtained.

To this preparation of solubilized or dispersed albumin, a predetermined amount of vitamin D active material in a form capable of mixing and forming a colloidal solution and admixture with the solubilized or dispersed albumin may be added. Fatty or oily materials are not wholly suitable for this purpose, although under certain circumstances such oily vehicles carrying the vitamin may be used and a suitable dispersion of such material obtained. The effectiveness and working of the process, however, are not as satisfactory as with a vehicle which is readily miscible with the aqueous colloidal albumin solution. It is preferred that the vitamin D be added in such a vehicle as propylene glycol, for example, or a similar vitamin D solvent readily miscible with water, when water comprises a large proportion of the mixture to which the vitamin is to be added. As a specific example, satisfactory results have been obtained by adding 1 cc. of a propylene glycol solution of vitamin D to 2 liters of albumin solution having an albumin concentration of .02%, the propylene glycol solution containing about .05% vitamin D.

It is preferred to avoid too large proportions of the propylene glycol vitamin D solution per unit amount of water since, under such circumstances, the vitamin D, especially on standing, may be thrown out of solution and a visible turbidity or haze of the agglomerated vitamin D molecules may be produced. While this feature does not entirely prevent or appreciably destroy the effectiveness of the vitamin D-protein simplex, it is believed that the combination between protein and vitamin D or the physical association between the two elements of the simplex is not as desirable as in the case when concentrations are used which prevent agglomeration of the vitamin. The preferred working of the process, therefore, involves the admixture of a water clear solution or a substantially water clear solution of dispersed lactalbumin with predetermined amounts of the vitamin D, also in a water clear or substantially water clear solution. Of course, the predetermined amounts of vitamin are not a necessity but are convenient for recording and maintaining the proper strength and antirachitic potency of the mixture.

The mixture or the dispersed albumin constituent should not be heated to a temperature which will flocculate or throw the albumin out as a precipitate before addition of the vitamin solution, if it is desired to produce the protein-vitamin D simplex most efficiently and to maintain the vitamin simplex uniformly in the fluid or aqueous vehicle. Also, for the same purpose, the pH value of the albumin preferably be maintained between 6.3 and 6.9 and should not be so far on the acidic side as to permit flocculation of the albumin. By maintaining the pH value within the range described above, the albumin-vitamin D simplex remains as a uniform colloidal dispersion retaining its vitamin D potency and possessing antirachitic effectiveness greater than the same unit amount of vitamin D not so associated with dispersed protein matter. This solution may be used directly or it may be concentrated or dried as described in the aforementioned Patent No. 2,023,014, for example, by evaporation at low temperatures and spray drying. The dried product will be water soluble and of high antirachitic value.

The vitamin D simplex in which the vitamin D is bound with or physically associated with the protein may be separated by reducing the pH value of a mixture or a solution or dispersion of vitamin D and lactalbumin prepared as above mentioned, to a pH value lying between about 5.2 and about 4.1. After or during this adjustment, the mixture may be heated, for example, to a temperature of about 50° C., whereupon the albumin will be precipitated and flocculated substantially quantitatively, removing from colloidal solution all or substantially all of the albumin and the vitamin D. This precipitated albumin-vitamin D simplex may be removed from the aqueous medium by sedimentation and decantation or by other suitable mechanical means. If sedimentation and decantation are employed, it is preferred that this be carried out at a low temperature (not below freezing). This, however, is not essential to the process.

The precipitated material undried and while moist may be subjected to a washing with water acidified to the pH value at which the albumin is precipitated. This washing may be carried out at any appropriate temperature and the precipitate mechanically removed by repeated sedimentation or decantation or preferably by centrifuging. These washings may be repeated if desired.

The precipitated albumin-vitamin D simplex may be redissolved or resuspended in water and used or stored in that form.

Or, the precipitated material may be dried, by an appropriate means, without loss of vitamin D potency or antirachitic value. It is preferred, however, to dessicate at relatively low temperatures, preferably under vacuum or with spray drying, and thus avoid undue and drastic effects upon the albumin as a result of excessive heat treatment.

The albumin-vitamin D simplex thus produced and dried may be stored and subsequently suspended in water and the pH value of the aqueous vehicle adjusted to between 6.3 and 7.0, under which condition the vitamin D-lactalbumin simplex will become redispersed as a colloidal lactalbumin-vitamin D solution. The product may then be administered in this liquid aqueous form. Such previously dried and resolubilized or redispersed vitamin D-lactalbumin simplex has substantially the same properties with respect to vitamin D activity as the mixture before precipitation and subsequent drying.

By this procedure, there is produced a vitamin D-protein simplex entirely soluble in water, substantially free from fatty material and highly active in antirachitic potency, which material may be administered and used entirely in the aqueous phase.

The example given above is illustrative of the preferred utilization of the invention. If desired, however, separated water soluble or insoluble albumin may be activated with vitamin D in other ways, for example, by exposing it momentarily to ultra-violet rays as it is suspended in thin flowing films, agglomerated or as a colloidal dispersion, in an aqueous or other suitable fluid vehicles; or, a colloidal solution may be activated by contacting the dispersed colloidal particles with a concentrated aqueous or oil solution of vitamin D or with a solution of vitamin D in some other solvent which is either miscible with water or which permits sufficient close contact between molecules of vitamin D and the dispersed protein molecules to effect activation of the latter, either by physical affinity or physico-chemical combination. Irrespective of the precise manner in which the protein is activated in accordance with the examples cited, the protein-vitamin D simplex may be precipitated and separated from the aqueous vehicle in the manner above described.

Also, the invention may be utilized by activating the lactalbumin in the milk or whey before it is separated therefrom. Such activation is preferably accomplished by contacting milk, skimmed milk, or the whey after removal of casein, with a solution of vitamin D in a solvent which is miscible with water, or which permits the maximum contact between the dispersed protein of the milk or whey and the dispersed or diffused molecules of the vitamin; vitamin D in propylene glycol solution or other suitable solvents may be used, although the protein may be activated in other ways.

After such treatment the activated lactalbumin-protein simplex may be separated by coagulating it through proper control of pH and of temperatures. This material may then be dried and in doing so it is important to maintain the temperature sufficiently low to avoid damaging the albumin. The lactalbumin may be separated, for example, as described in the above mentioned Patent No. 2,023,014, in which event the solution of activated lactalbumin-protein simplex may be stored or the lactalbumin-protein simplex may be coagulated by increasing the acidity of the solution. The coagulate may be dried and stored or transported, after which it may be subsequently put into solution if it is desired to use it in that form.

The products described above may be mixed, in the dry form or in solution, with other dry milk products or other products or solutions of such products. For instance, the dried vitamin D-protein simplex may be mixed with powdered milk or powdered milk products to increase the vitamin potency of such materials or of the products made from them. Or it may be put in solution and mixed with milk or liquid milk products to increase the vitamin D potency of such material or of the products in which they are used. Also, a simplex or complex of vitamin D and other protcinaceous or nitrogenous materials, such as the casein or globulins or unclassified proteinaceous or nitrogenous materials of milk, may be prepared by activation of the dispersed proteinaceous matter of of solutions of it as described above.

The product resulting from the procedure described above may be used in foods or in medicines where it is desired to increase the antirachitic value of such products.

The lactalbumin-protein simplex to be separated may be prepared in the milk by adding to the milk vitamin D in an appropriate vehicle as, for example, vitamin D in propylene glycol, which vehicle is capable of mixing with the water phase of the milk and thereby permitting combination, physical association or union with the dispersed colloidal proteins of the milk. This may be accomplished by adding a propylene glycol solution of vitamin D, for example, 1 cc. of such a solution containing .05% vitamin D, to 50 cc. of water and then adding this water solution to 8 liters of milk and agitating the mixture until thorough diffusion has taken place. Such a procedure may be carried out at ordinary temperatures and it is immaterial whether the milk has been previously preheated as in pasteurization or subjected to the temperatures prevailing in the preparation of commercial evaporated milk.

As illustrative of the increased effectiveness resulting from the use of the invention, the application of predetermined amounts of vitamin D in different forms was compared as follows:

Pure crystalline vitamin D in solution in propylene glycol was fed to properly prepared rachitic test animals in predetermined and known amounts. The propylene glycol solution of vitamin D having been first previously mixed with water in such proportions that all test animals were given the same amount of the aqueous medium but wherein this amount carried variable amounts of the vitamin D. To other groups of similarly prepared test animals the same amount of the crystalline vitamin D carried by the propylene glycol, was fed, but in these tests the vitamin D was fed as a vitamin D-lactalbumin simplex prepared as described herein, a solution of purified soluble lactalbumin, prepared according to the above mentioned Patent No. 2,023,014, serving as the dispersed colloidal protein. The amount of albumin received by the animals as albumin-vitamin D simplex was 1.2 mg. per day.

Still other comparisons were made wherein the vitamin D was mixed with the solubilized albumin as the menstruum and the albumin content of this mixture then precipitated under specified conditions as described above; the precipitate thus obtained was fed to properly prepared rats.

These tests showed that as a result of feeding as high as 0.375 gamma of pure vitamin D per day in aqueous solutions without accompanying lactalbumin or milk protein, negative reactions, or in other words no antirachitic effect was noted in the test animals. When similar amounts of the vitamin D were fed in the form of the vitamin D-albumin simplex, marked antirachitic effects were found when as low as 0.15 gamma of the vitamin were fed per day in conjunction with 1.2 mg. of the solubilized lactalbumin. Furthermore, when as low as 0.06 gamma of the vitamin D in the form of vitamin D-albumin simplex in conjunction with 1.2 mg. of the solubilized lactalbumin were fed per day there was measurable and detectable evidence of antirachitic effect.

It was also found that the precipitated albumin carries all or substantially all of the added vitamin D and that the filtrate from which the precipitated albumin is removed contains little or none of the vitamin as manifested by negative antirachitic activity from standard test procedure.

The results obtained from the feeding of vitamin D in the form of a vitamin D-lactalbumin simplex indicate that the enhanced effectiveness of unit amounts of the vitamin is caused by the particular character of the combination or association with the protein, and not solely by the presence of calcium or phosphorus inherent to the natural milk, because the albumin dispersion used for combination with the vitamin D in the above described combination contained no, or at the utmost substantially undeterminable amounts of calcium and only slight traces of phosphorus.

It is apparent that many modifications may be made in utilizing the above invention and it is not intended to limit it to the particular embodiments disclosed. The terms used in describing the invention have been used in their descriptive sense and not as terms of limitation and it is intended that all equivalents thereof be included within the scope of the appended claims. The terms water soluble and solution as used herein are intended to include substances capable of producing colloidal solutions in water and to include colloidal solutions, as differentiated from a true solution.

I claim:

1. A method for preparing an antirachitically active product comprising treating a dispersed suspension of a proteinaceous material in an aqueous medium to increase its vitamin D content and separating the combined proteinaceous material and vitamin D from the dispersion by adjusting the pH of the dispersion to precipitate the proteinaceous material.

2. A method for preparing an antirachitically active product comprising mixing an aqueous dispersion of proteinaceous material with a dispersion of vitamin D in a vehicle miscible with water, and adjusting the pH of the resulting mixture to precipitate the proteinaceous material.

3. A method for preparing an antirachitically active product comprising mixing an aqueous dispersion of a milk product containing lactalbumin with a solution of vitamin D in an alcohol, and adjusting the pH of the resulting mixture to precipitate the proteinaceous material.

4. A method for preparing an antirachitically active product comprising treating an aqueous dispersion of albumin having a pH of about 6.3 to 7 to increase its vitamin D content and separating the combined albumin and vitamin D from the dispersion by adjusting the pH of the dispersion to about 5.2 to 4.1.

5. A method of preparing an antirachitically active product comprising contacting an aqueous dispersion of proteinaceous material with a dispersion of vitamin D in a vehicle miscible with water at a pH of about 6.3 to 7 and separating the combined proteinaceous material and vitamin D from the dispersion by adjusting the pH of the dispersion to about 5.2 to 4.1.

6. A method for preparing an antirachitically active product comprising treating an aqueous dispersion of albumin having a pH of about 6.3 to 7 to increase its vitamin D content and separating the combined albumin and vitamin D from the dispersion by adjusting the pH of the dispersion to about 5.2 to 4.1 and drying the separated albumin-vitamin D product.

7. A method for preparing an antirachitically active product comprising separating proteinaceous material from a milk product, redispersing the proteinaceous material in water and treating the dispersion to increase its vitamin D content.

8. A method for preparing an antirachitically active product comprising separating albumin from a milk product, redispersing the albumin in water and treating the dispersion to increase its vitamin D content.

9. A method for preparing an antirachitically active product comprising separating proteinaceous material from a milk product, redispersing the proteinaceous material in water, and mixing the dispersion with a dispersion of vitamin D in a vehicle miscible with water.

10. A method for preparing an antirachitically active product comprising separating proteinaceous material from a milk product, redispersing the proteinaceous material in an aqueous medium, treating the dispersion to increase its vitamin D content, and adjusting the pH of the dispersion to precipitate the combined vitamin D and proteinaceous material.

11. A method for preparing an antirachitically active product comprising separating lactalbumin from a milk product, redispersing the lactalbumin in an aqueous medium, treating the dispersion to increase its vitamin content by contacting it with a solution of vitamin D in an alcohol, and adjusting the pH of the dispersion to precipitate the combined vitamin D and lactalbumin.

12. A method for preparing an antirachitically active product comprising separating lactalbumin from a milk product, redispersing the lactalbumin in an aqueous medium, treating the dispersion to increase its vitamin D content by contacting it with a solution of vitamin D in propylene glycol, and adjusting the pH of the dispersion to precipitate the combined vitamin D and lactalbumin.

13. A method for preparing an antirachitically active product comprising separating proteinaceous material from a milk product, redispersing the proteinaceous material in an aqueous medium, treating the dispersion to increase its vitamin D content, adjusting the pH of the dispersion to precipitate the combined vitamin D and proteinaceous material, and separating and drying the precipitated combined vitamin D and proteinaceous material.

14. A method for preparing an antirachitically active product comprising separating a water soluble lactalbumin from a milk product, redispersing the lactalbumin in an aqueous medium, treating the dispersion to increase its vitamin D content, and adjusting the pH of the dispersion to precipitate the combined vitamin D and lactalbumin.

15. A method for preparing an antirachitically active product comprising separating a water soluble lactalbumin from a milk product, redispersing the lactalbumin in an aqueous medium, contacting the dispersion with a dispersion of vitamin D in a vehicle miscible with water at a pH of about 6.3 to 7 and adjusting the pH of the dispersion to about 5.2 to 4.1 to precipitate the combined vitamin D and lactalbumin.

16. A method as defined in claim 2 in which the precipitated material is dried and redispersed in an aqueous vehicle having a pH between 6.3 and 7.0.

17. A method for preparing an antirachitically active product comprising mixing an aqueous dispersion of a milk product containing between about 0.02% to about 0.5% lactalbumin with a solution of vitamin D in a vehicle miscible with water, and adjusting the pH of the resulting mixture to precipitate the proteinaceous material.

18. A method for preparing an antirachitically active product comprising mixing an aqueous dispersion of a milk product containing lactalbumin with a solution of vitamin D in a vehicle miscible with water, and adjusting the pH of the resulting mixture and heating to precipitate the proteinaceous material.

19. A method for preparing an antirachitically active product comprising mixing an aqueous dispersion of a milk product containing lactalbumin with a solution of vitamin D in a vehicle miscible with water, adjusting the pH of the resulting mixture to precipitate the proteinaceous material, and separating and drying such precipitated material.

GEORGE C. SUPPLEE.